(12) United States Patent
Li

(10) Patent No.: US 6,940,398 B2
(45) Date of Patent: Sep. 6, 2005

(54) METHOD AND APPARATUS FOR OBJECT DETECTION AND RANGING

(76) Inventor: Shih-Hsiung Li, 7F-5, No. 23, Sec. 1, Hangchow S. Rd., Taipei (TW)

( * ) Notice: Subject to any disclaimer, the term of this patent is extended or adjusted under 35 U.S.C. 154(b) by 16 days.

(21) Appl. No.: 10/784,503

(22) Filed: Feb. 23, 2004

(65) Prior Publication Data

US 2004/0164852 A1 Aug. 26, 2004

Related U.S. Application Data

(62) Division of application No. 10/156,619, filed on May 28, 2002.

(51) Int. Cl.$^7$ ................................................. B60Q 1/00
(52) U.S. Cl. ....................... 340/435; 701/301; 307/10.1
(58) Field of Search ................................ 340/435, 436, 340/903, 904, 905; 701/301; 307/10.1

(56) References Cited

U.S. PATENT DOCUMENTS

| 4,836,024 | A | * | 6/1989 | Woehrl et al. | ............. | 307/10.1 |
| 5,424,583 | A | * | 6/1995 | Spies et al. | ................. | 307/10.1 |
| 5,867,800 | A | * | 2/1999 | Leif | .............................. | 701/23 |
| 6,369,700 | B1 | * | 4/2002 | Yamada | ....................... | 340/435 |
| 6,611,759 | B2 | * | 8/2003 | Brosche | ....................... | 701/301 |

* cited by examiner

Primary Examiner—John Tweel, Jr.
(74) Attorney, Agent, or Firm—Hedman & Costigan, P.C.

(57) ABSTRACT

A method and apparatus for object detection and ranging is disclosed. A returned signal is sequentially received by one of several sensors mounted on a host vehicle. Each one in turn initiates successive sampling to collect a series of returned signal values, which are then compared with corresponding threshold values previously saved in a memory device to determine whether any object is in the way of the vehicle backing up and also to estimate the relative distance from the object. The control circuit in accordance with the invention includes a processor, which together with a channel selector establishes a sequence of signal transmission and reception each time by one of several sensors. A sampled signal is first passed through and A/D converter to become digital, and then it is input to the processor for object detection and ranging computation.

7 Claims, 15 Drawing Sheets

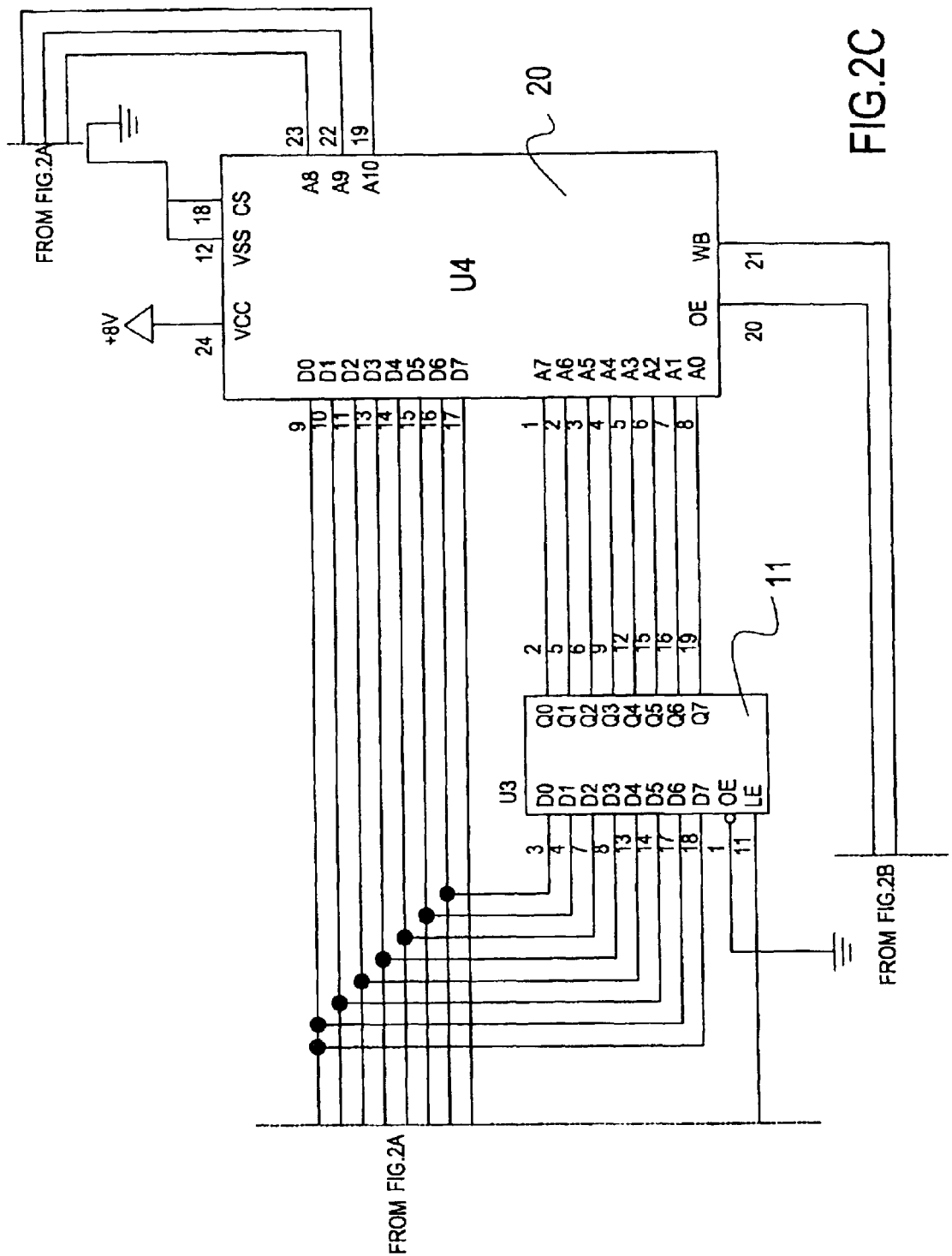

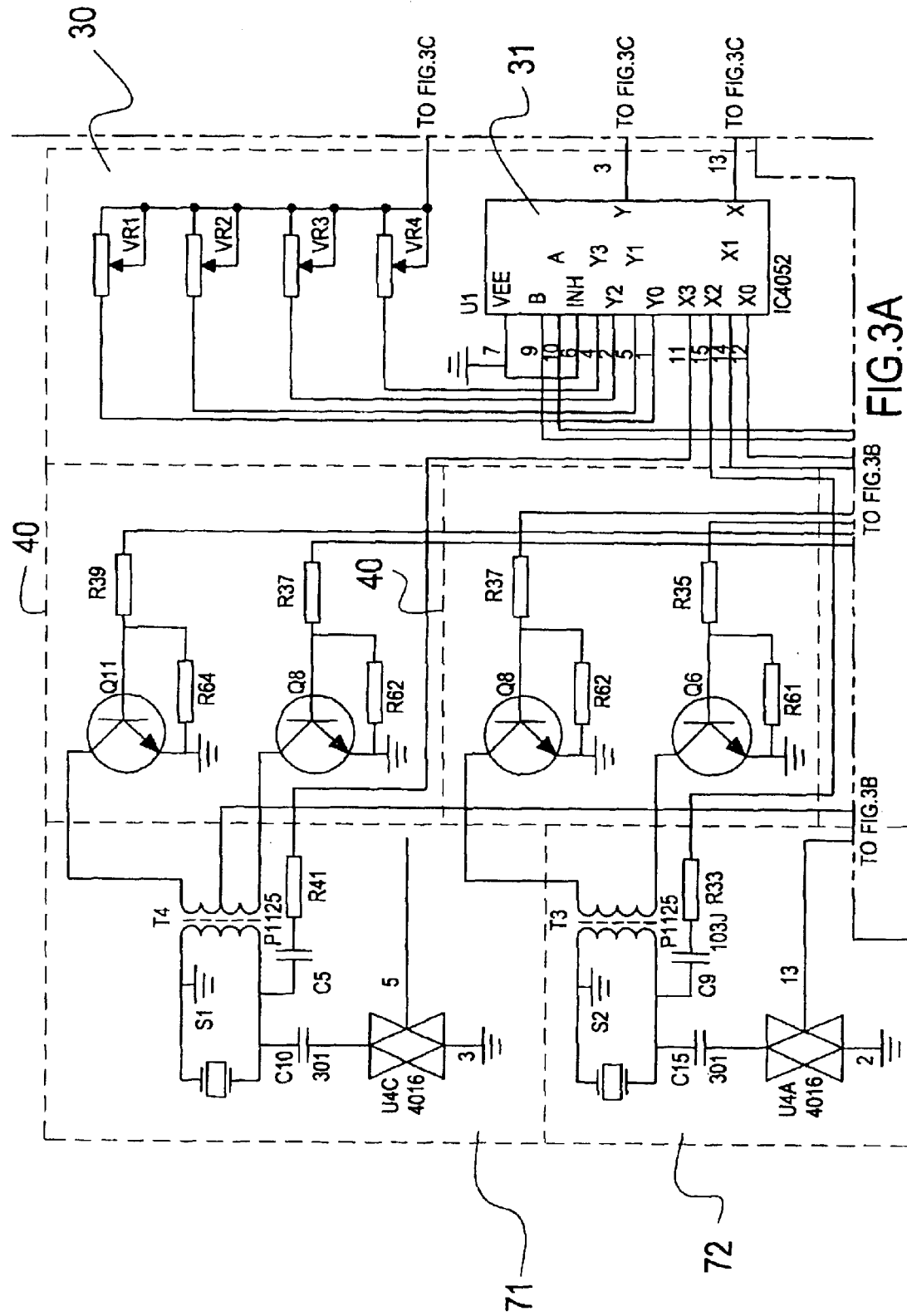

| SAMPLE ORDER n | THRES-HOLD VALUE $V_n$ | FIRST SENSOR $mX_n$ | | SECOND SENSOR $mY_n$ | | THIRD SENSOR $mZ_n$ | | FOURTH SENSOR $mW_n$ | |
|---|---|---|---|---|---|---|---|---|---|
| | | m=1 | m=2 | m=1 | m=2 | m=1 | m=2 | m=1 | m=2 |
| 1 | $V_1$ | $X_1$ | $2X_1$ | $Y_1$ | $2Y_1$ | $Z_1$ | $2Z_1$ | $W_1$ | $2W_1$ |
| 2 | $V_2$ | $X_2$ | $2X_2$ | $Y_2$ | $2Y_2$ | $Z_2$ | $2Z_2$ | $W_2$ | $2W_2$ |
| 3 | $V_3$ | $X_3$ | $2X_3$ | $Y_3$ | $2Y_3$ | $Z_3$ | $2Z_3$ | $W_3$ | $2W_3$ |
| 4 | $V_4$ | $X_4$ | $2X_4$ | $Y_4$ | $2Y_4$ | $Z_4$ | $2Z_4$ | $W_4$ | $2W_4$ |
| ... | ... | ... | ... | ... | ... | ... | ... | ... | ... |
| 248 | $V_{248}$ | $X_{248}$ | $2X_{248}$ | $Y_{248}$ | $2Y_{248}$ | $Z_{248}$ | $2Z_{248}$ | $W_{248}$ | $2W_{248}$ |
| 249 | $V_{249}$ | $X_{249}$ | $2X_{249}$ | $Y_{249}$ | $2Y_{249}$ | $Z_{249}$ | $2Z_{249}$ | $W_{249}$ | $2W_{249}$ |
| 250 | $V_{250}$ | $X_{250}$ | $2X_{250}$ | $Y_{250}$ | $2Y_{250}$ | $Z_{250}$ | $2Z_{250}$ | $W_{250}$ | $2W_{250}$ |

FIG. 4

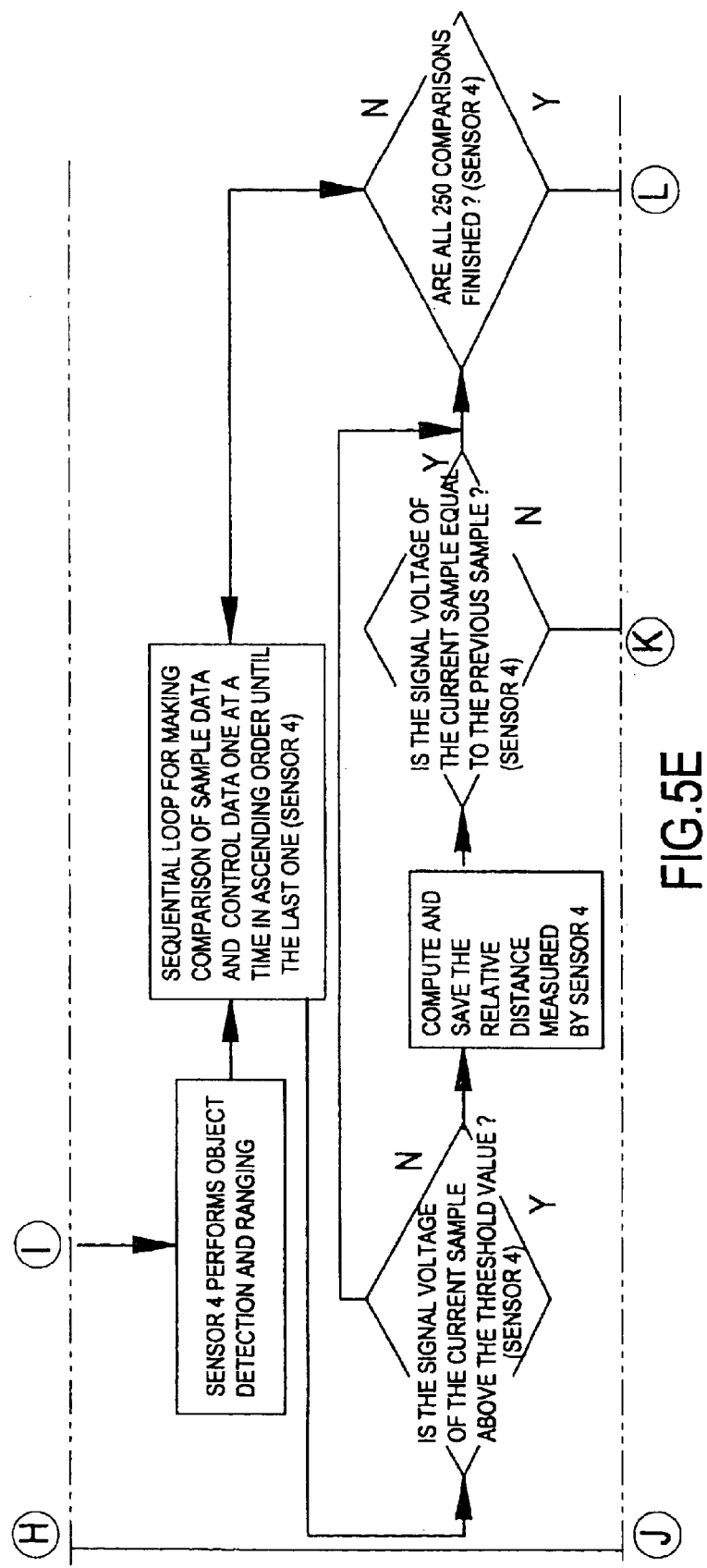

METHOD AND APPARATUS FOR OBJECT DETECTION AND RANGING

REFERENCE TO RELATED APPLICATION

The present application is a divisional application of U.S. Pat. application Ser. No. 10/156,619, filed on May 28, 2002, now pending.

BACKGROUND OF THE INVENTION

1. Field of the Invention

The present invention relates to a method and apparatus for object detection and ranging, which is used by vehicle backing systems, especially to a technique that incorporates dynamic adjustment of environmental control parameters in the object detection and ranging process, so as to enhance the system accuracy.

2. Description of Related Art

When back-up sensors are installed in ordinary sedans, one of their main concerns is the accuracy in object detection and ranging. Erroneous triggering of back-up sensor alarms is often due to inadequate design of the control circuits rather than environmental interference. Ordinary sensors might react to a stray signal as if it was a signal reflection from a real object, when in fact there is no obstruction in the detecting range.

Since ranging signals are emitted radially, experiments show that roads covered by stones or small rocks often generate a great deal of ground clutter for the sensor. Besides, four-wheel drive vehicles, such as trucks or jeeps, often have spare tires or other hoisting gear mounted at the back of the vehicle, which tend to produce a considerable amount of clutter. Under such circumstances, vehicle back-up sensors often pick up false signals and activate the alarm, but in fact there is no obstruction behind the vehicle. These false alarms from the back-up sensor are quite annoying for vehicle drivers.

These and other problems can be avoided if the back-up sensor incorporates dynamic adjustment of environmental control parameters in the object detection and ranging procedures to filter out unwanted noise, thus enhancing the overall system accuracy.

SUMMARY OF THE INVENTION

The main objective of the present invention is to provide a method and apparatus for object detection and ranging with high accuracy by incorporating a technical means that can dynamically adjust the environmental control parameters during the object detection and ranging process.

The method for object detection and ranging in accordance with the present invention comprises the steps of setting a predetermined number of threshold values to correspond to various distances; successively taking a predetermined number of samples with respect to an echoed signal by each one of the sensors in turn, and saving the same in a memory device; and comparing each sampled signal with the respective threshold value, if the value of the newly sampled data is greater, that means an object is present in the detection range, so distance computation can be initiated. The current sample value is further compared with the control data (i.e. previous sample value). If the current sample value is not equal to the previous sample value, then the current sample data is saved to replace the previous control data; but if the two are equal or close to each other, the current sample value is only used for distance computation without updating the control data.

The apparatus for object detection and ranging includes a processor, an alarm, a memory device, a channel selector, a power booster, a sensor array and an A/D converter. The processor is connected to the alarm and the memory device and performs signal processing to detect any object and issue a warning. The memory device saves predetermined threshold values. The channel selector is coupled to the processor. The input of the power booster is connected to the channel selector, and the output to the sensor array. Multiple ultrasonic sensors or transceivers form the sensor array. The input of the A/D converter is connected to the output of the channel selector. The A/D converter converts the detected signals to a digital format to compute the relative distance.

The processor working with the channel selector controls the sequence of signal transmission and reception by one of several signal sensors or transceivers. The returned signals so received are then converted by the A/D converter to a digital format. The digital information is then passed to the processor for object detection and ranging computation.

The second objective of the present invention is to provide a detection and ranging technique to be used by vehicle backing systems, whereby the intensity of a sampled signal is compared with the previously saved threshold value in the sampling process, so as to filter out ground clutter and enhance the overall system accuracy.

The third objective of the invention is to provide a detection and ranging technique, whereby multiple signal sensors or transceivers are to be initialized when the vehicle backing system is first enabled, and each sensor or signal transceiver emits a test signal and receives the same signal echoed back. In the process, the time needed to reflect the signal and the time allowance for all stray signals to fade out are both recorded. The former is used to discriminate echoed signals from stray signals, and the latter is for setting up a noise shield so that most of these stray signals can be filtered out in the object detection and ranging process. The accuracy of object detection can therefore be improved.

Other features of the invention will become apparent from the detailed description when taken in conjunction with the attached drawings.

BRIEF DESCRIPTION OF THE DRAWINGS

FIGS. 2A–2C show a detailed circuit diagram of the first half of the signal processing circuit for the apparatus in accordance with the present invention including the processor, memory device, A/D converter and alarm;

FIGS. 3A–3D show a detailed circuit diagram of the second half of the signal processing circuit for the apparatus in accordance with the present invention including the sensor array, power booster, channel selector and signal amplifier;

FIG. 4 is the memory allocation of control data saved in the memory device in accordance with the present invention; and FIGS. 5A–5F show a logic diagram of the object detection and ranging process in accordance with the present invention.

DETAILED DESCRIPTION OF THE PREFERRED EMBODIMENT

Figure 1:
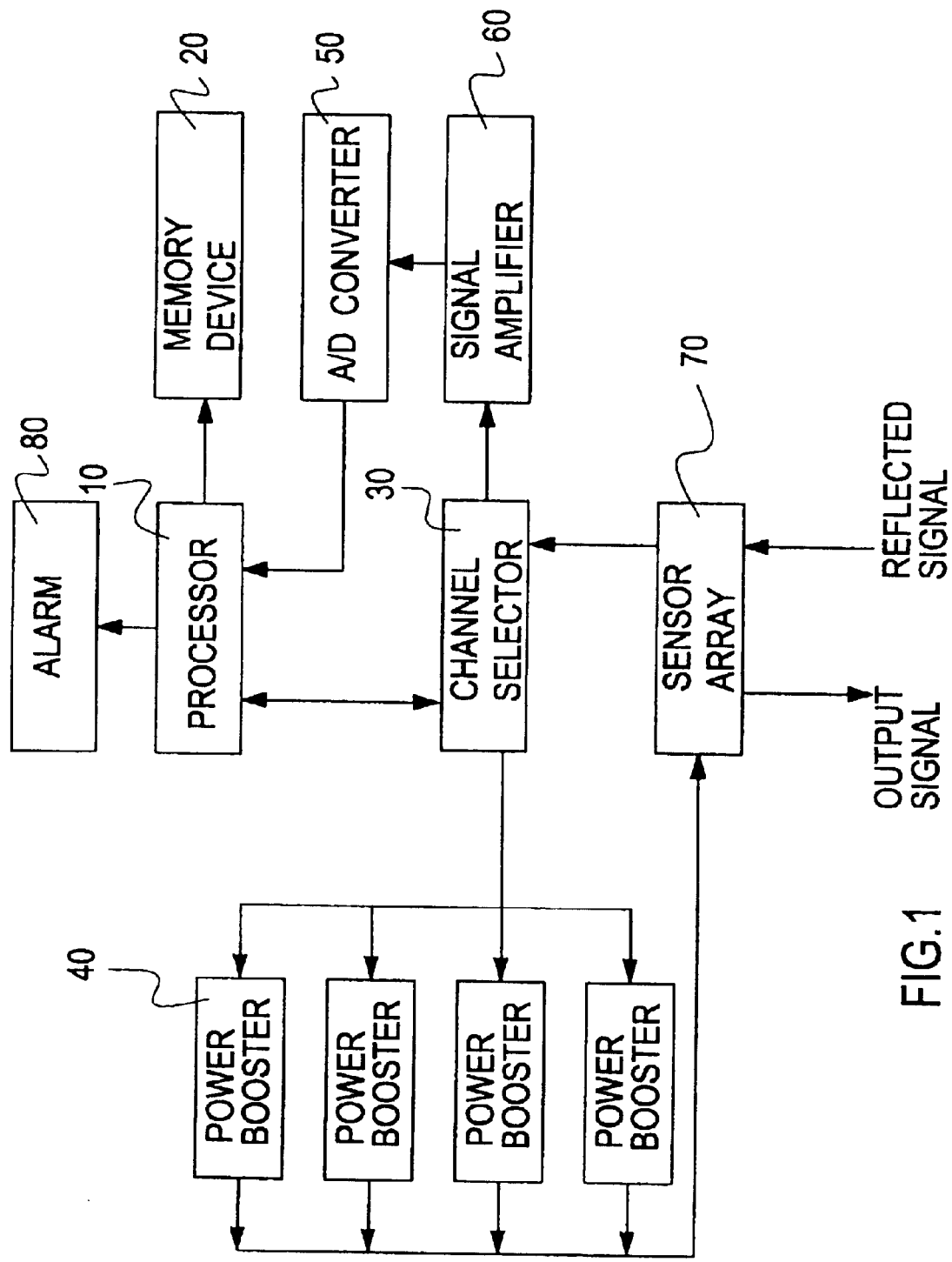
FIG. 1 is a block diagram of the object detection and ranging apparatus in accordance with the present invention.

The object detection and ranging apparatus as shown in FIG. 1 comprises a processor (10), a memory device (20), a channel selector (30), a power booster (40), a sensor array (70), a signal amplifier (60), an A/D converter (50) and an alarm (80). The processor (10) is connected to the memory device (20) that holds control data. The input of the channel selector (30) is connected to the processor (10), and the output is connected to multiple power boosters (40). Multiple ultrasonic sensors or transceivers (not shown) form the sensor array (70). Each transceiver is connected to a power booster (40) to control the emission of ranging signals. Multiple cascaded operational amplifiers form a signal amplifier (60). The signal amplifier (60) is electrically connected between the input of the A/D converter (50) and an output of the channel selector (30). With further reference to FIGS. 3A–3D, a shielding circuit (61) is connected across the output and grounding of the first operational amplifier, which is mainly controlled by a transistor in the circuit. The alarm (80) is controlled by the processor (10) and a buzzer is used in the embodiment described for illustrative purposes.

Figure 2A:
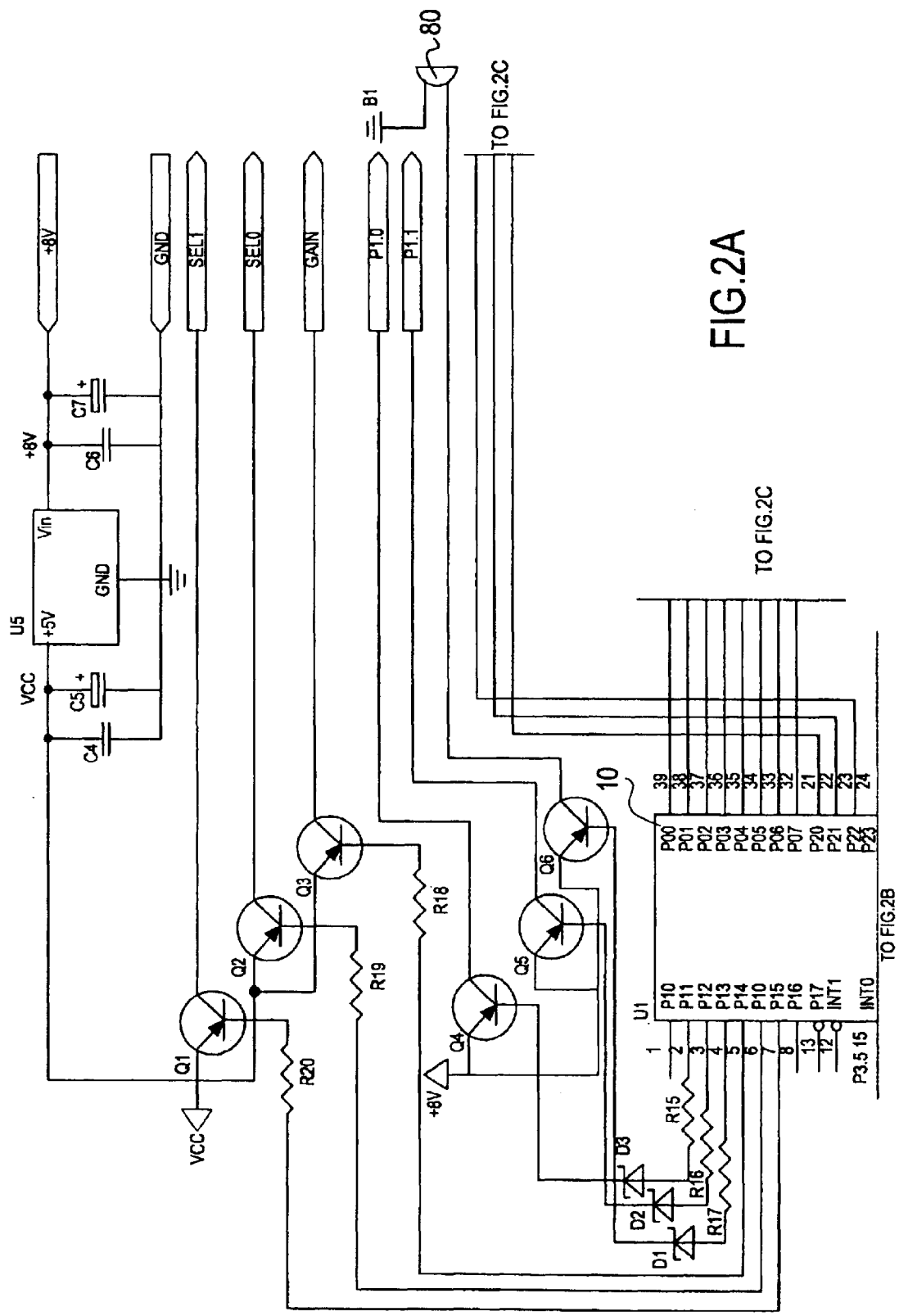
Figure 2B:
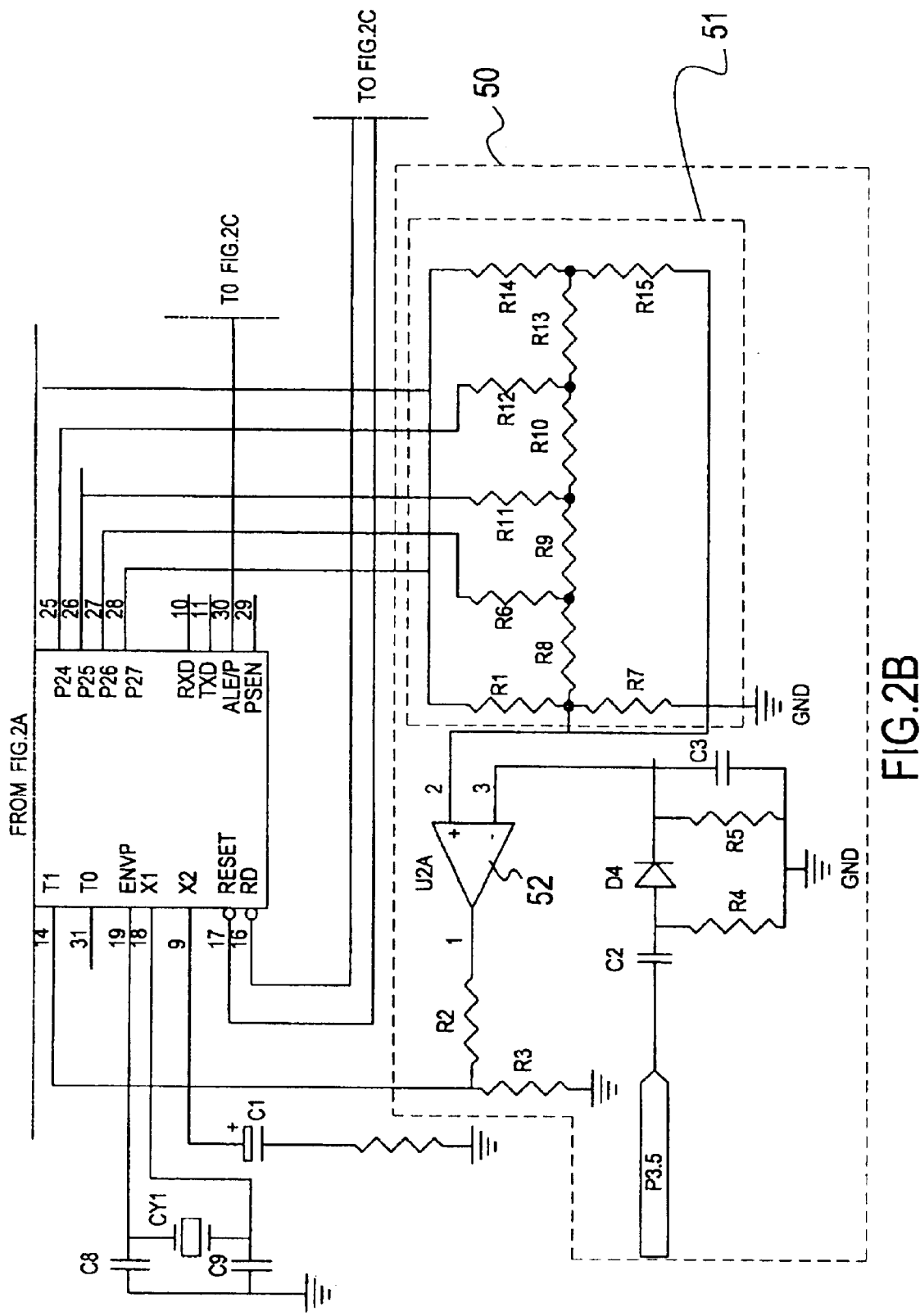
Figure 3B:
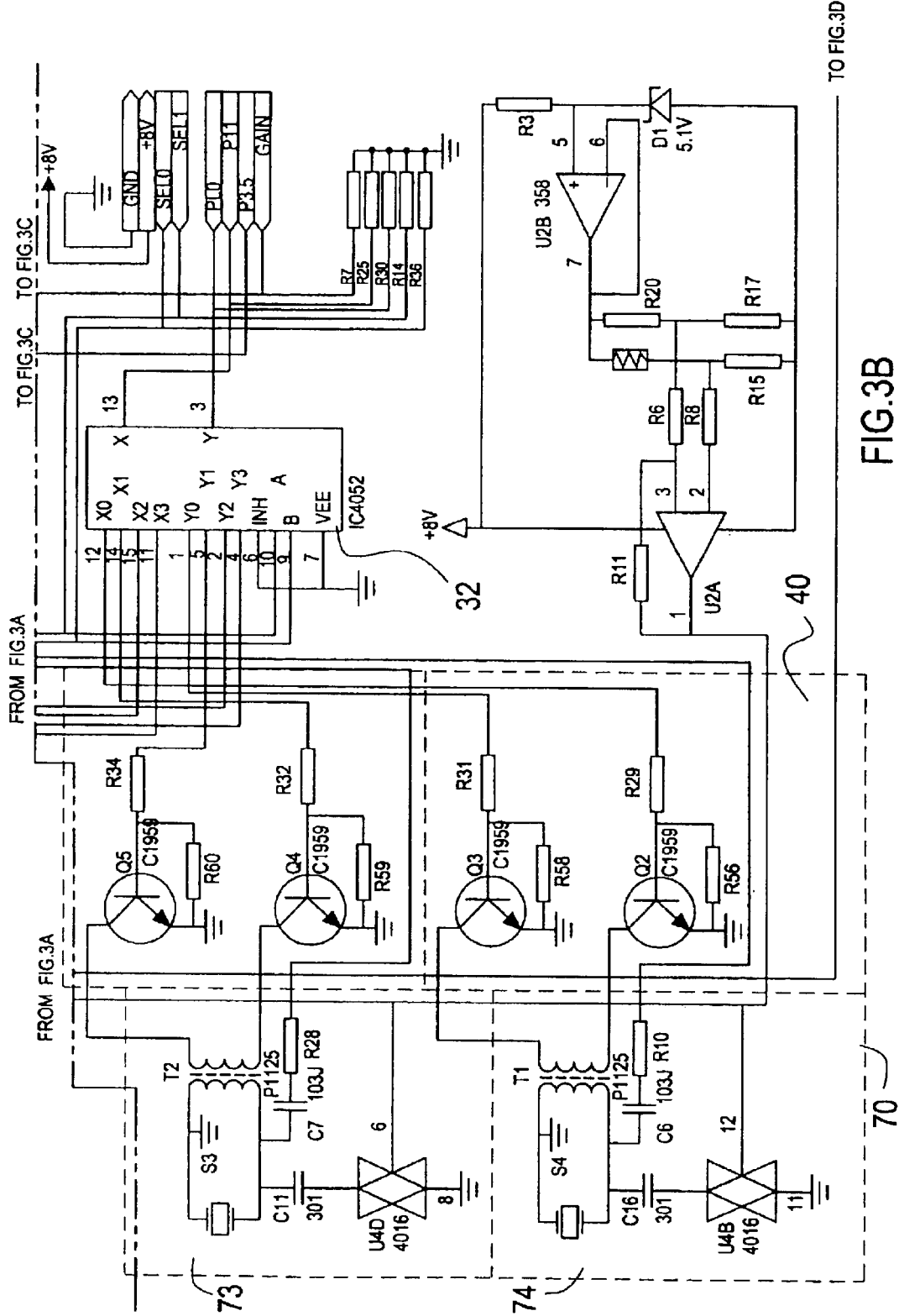
Figure 3C:
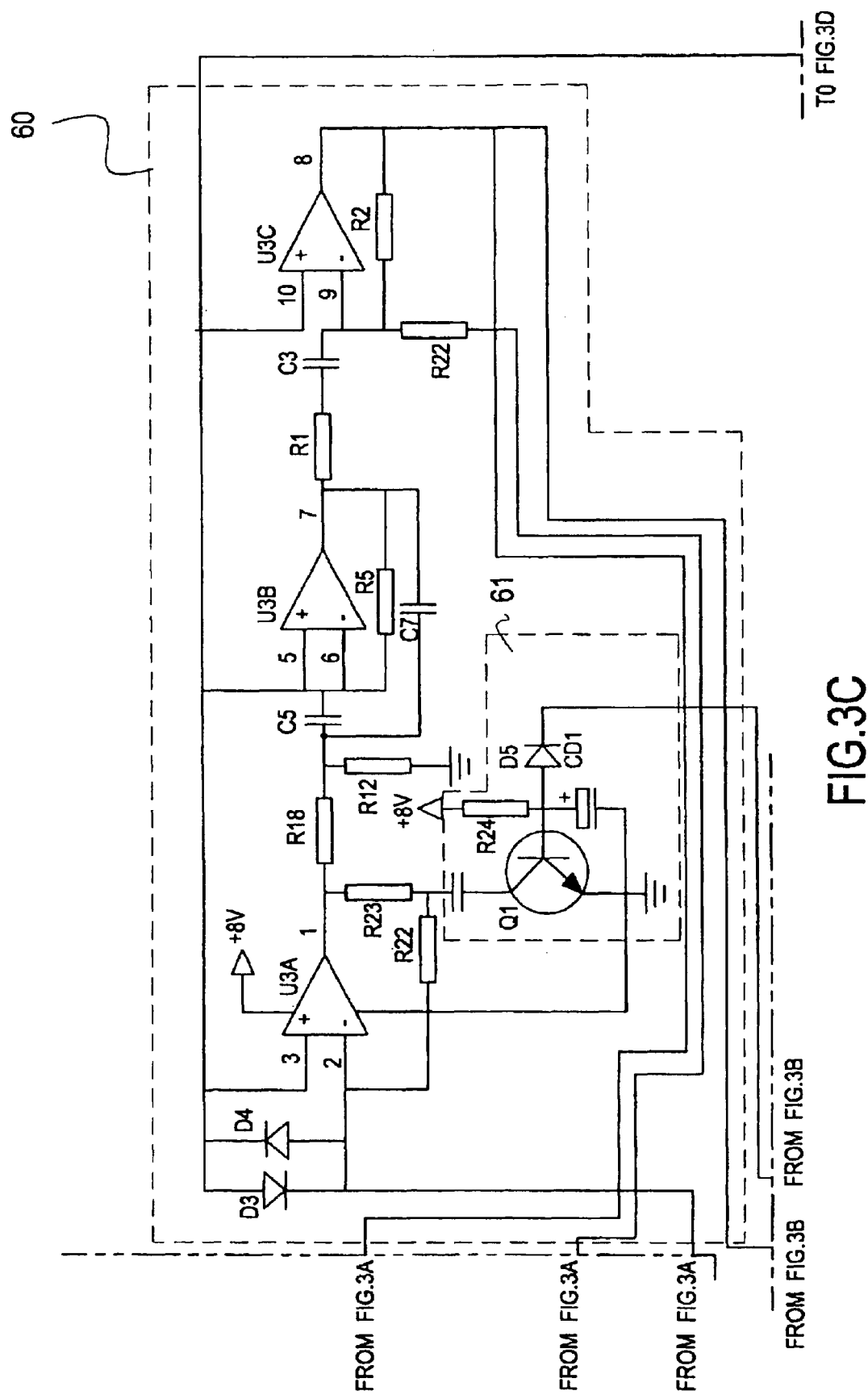
Figure 3D:
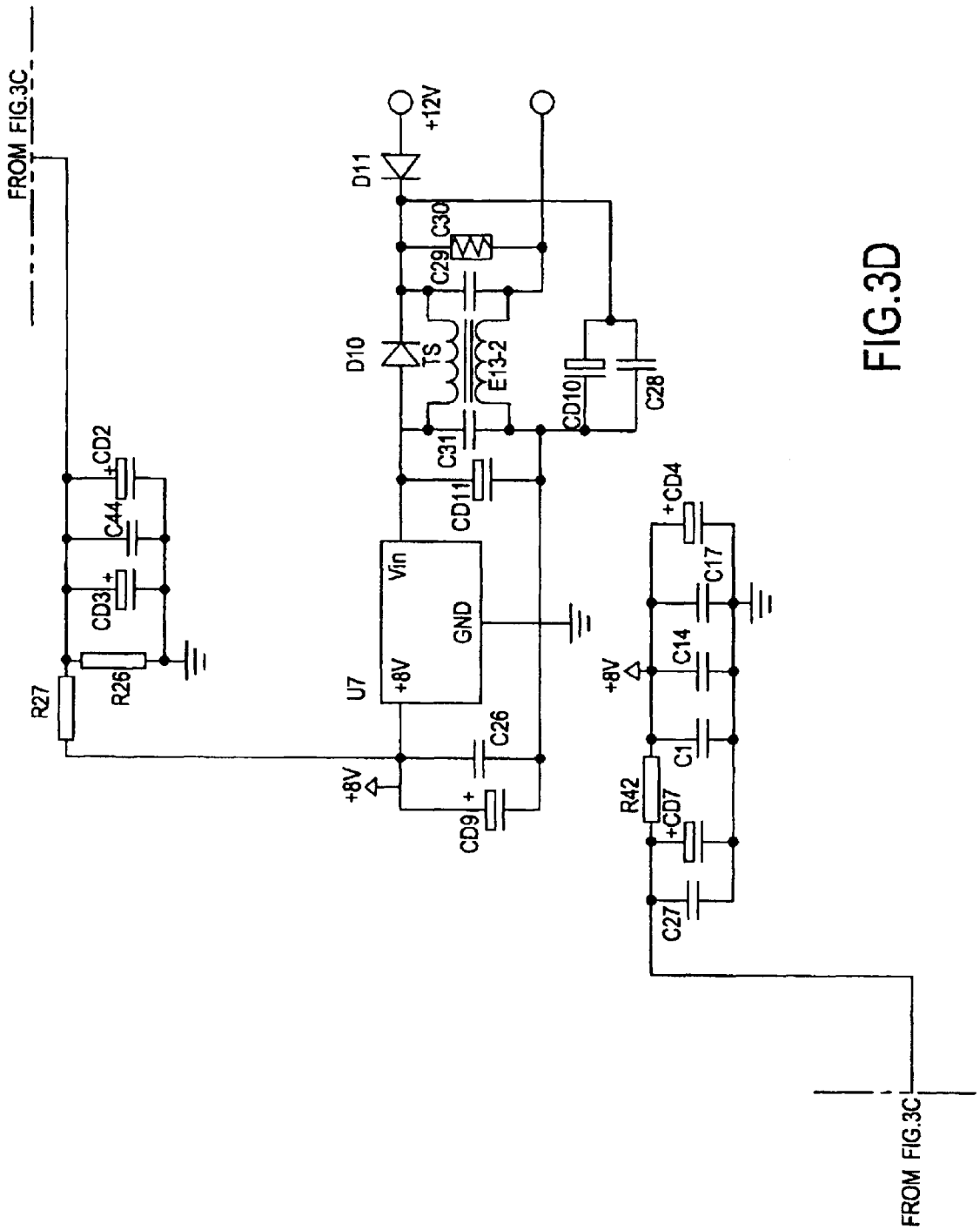
Figure 5A:
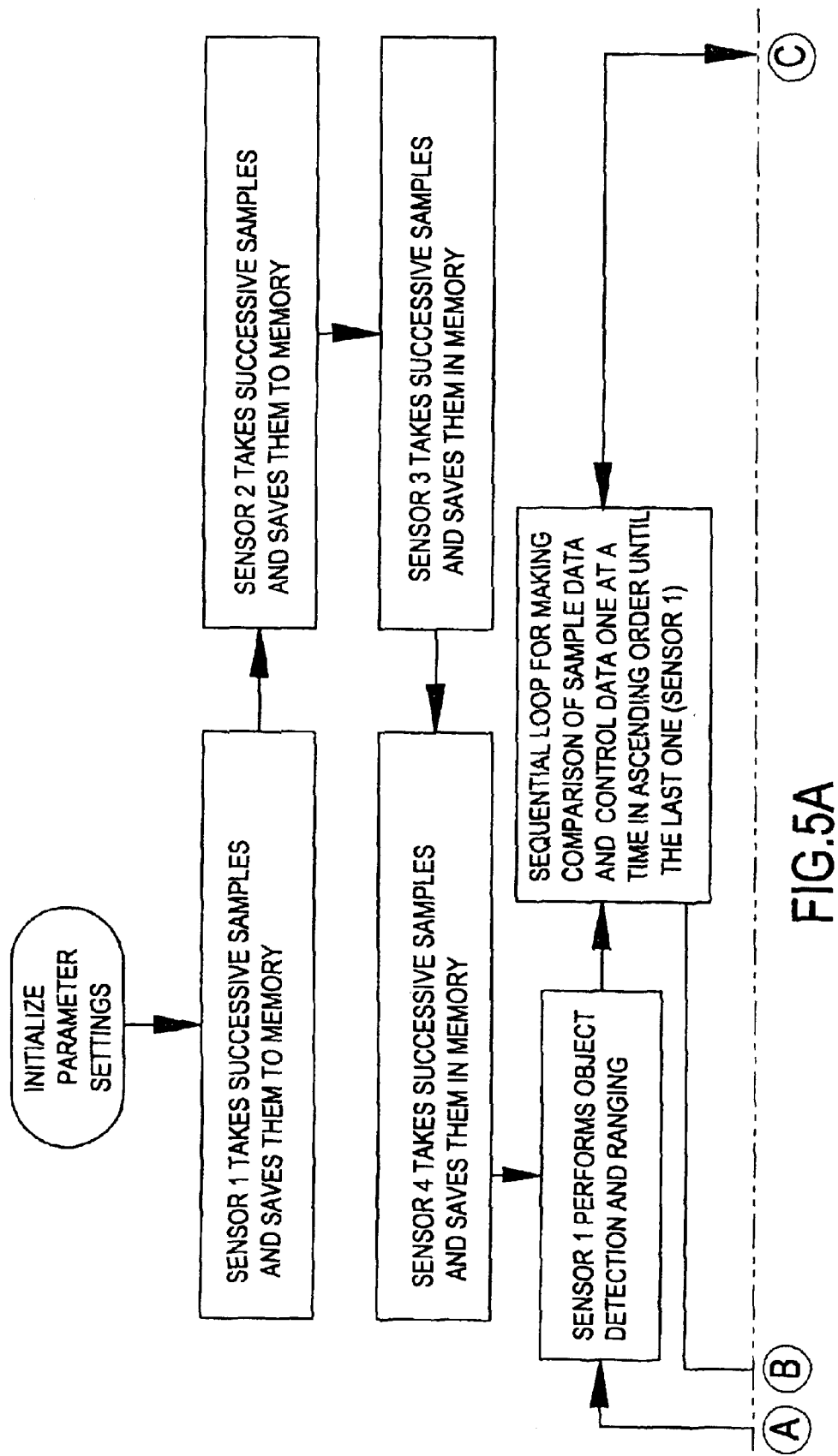
Figure 5B:
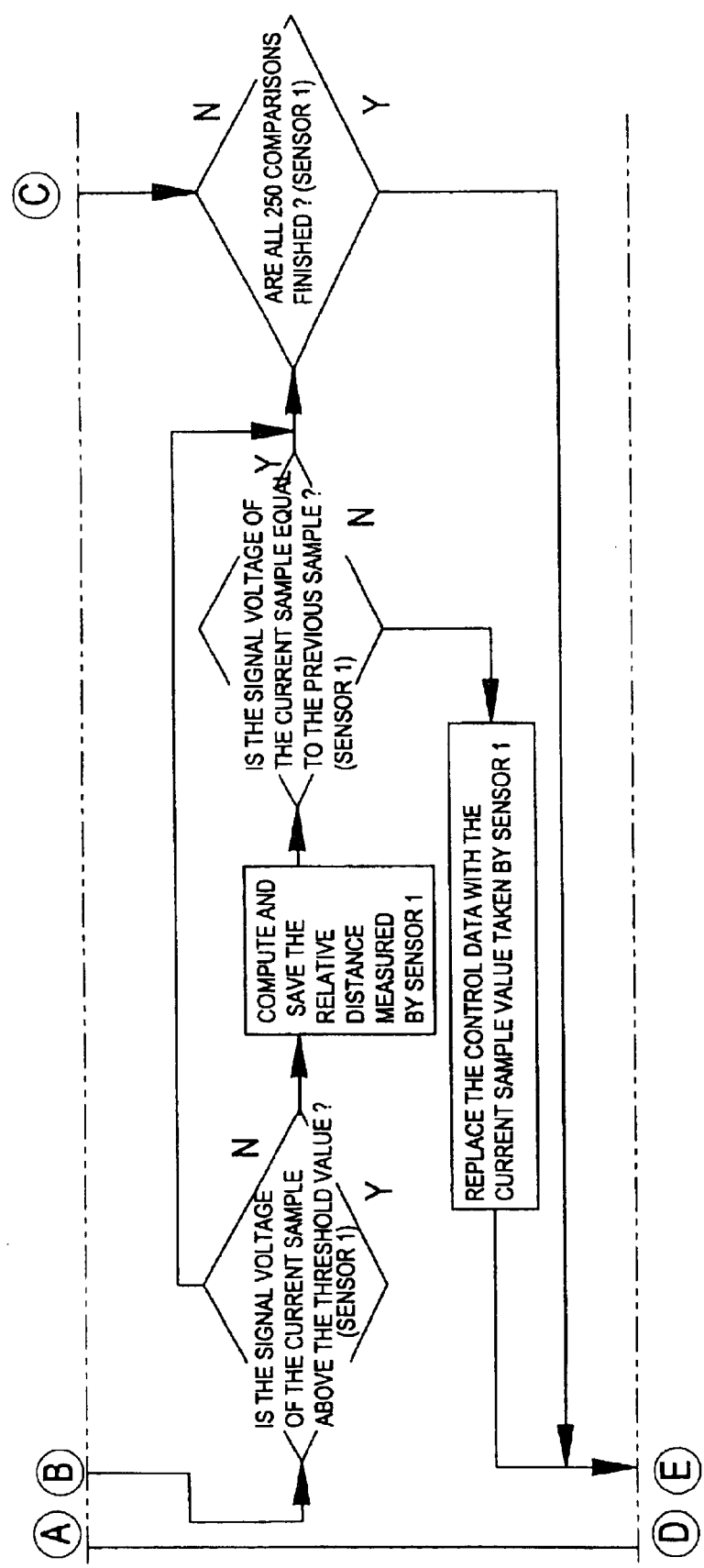
Figure 5C:
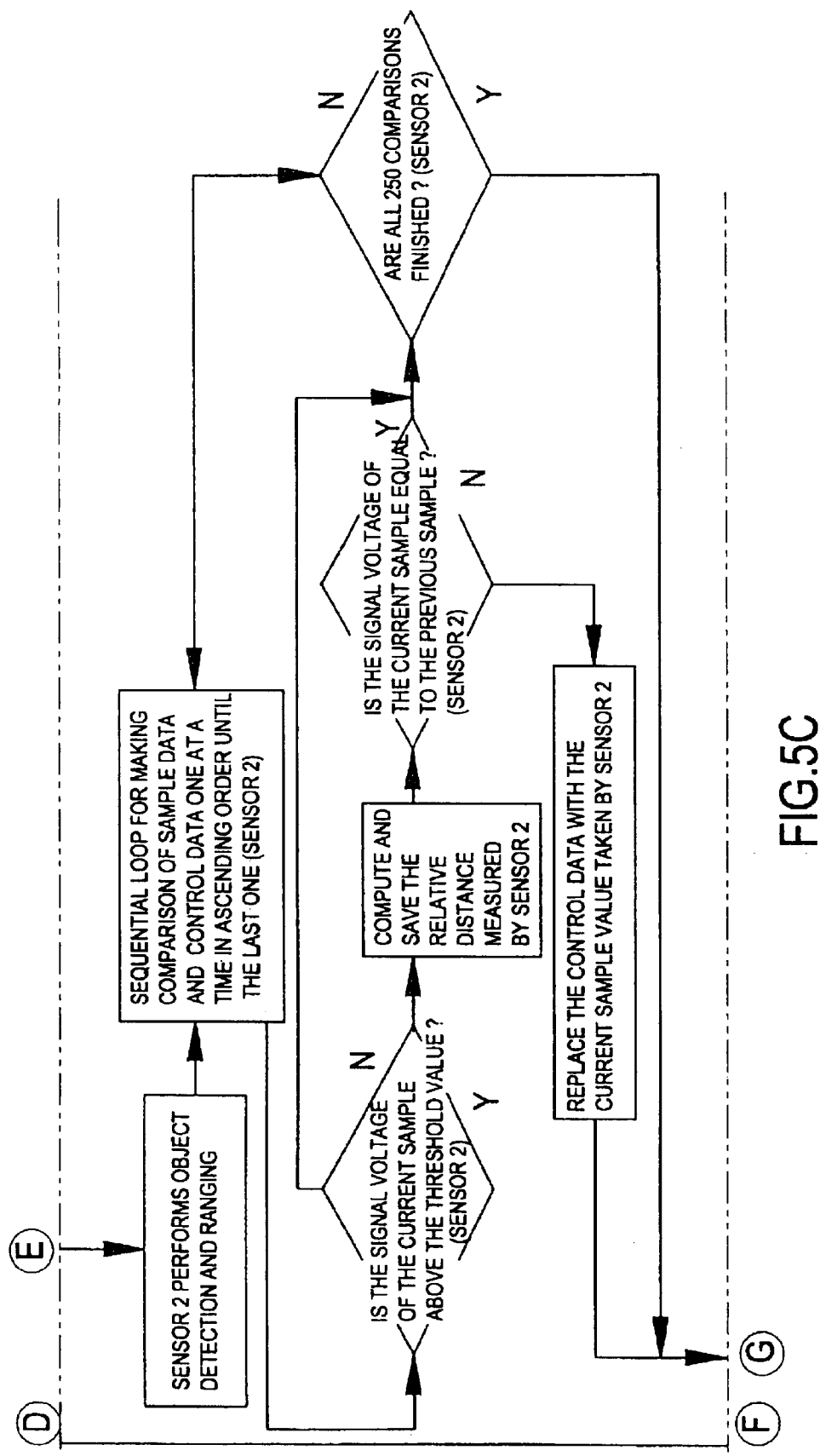
Figure 5D:
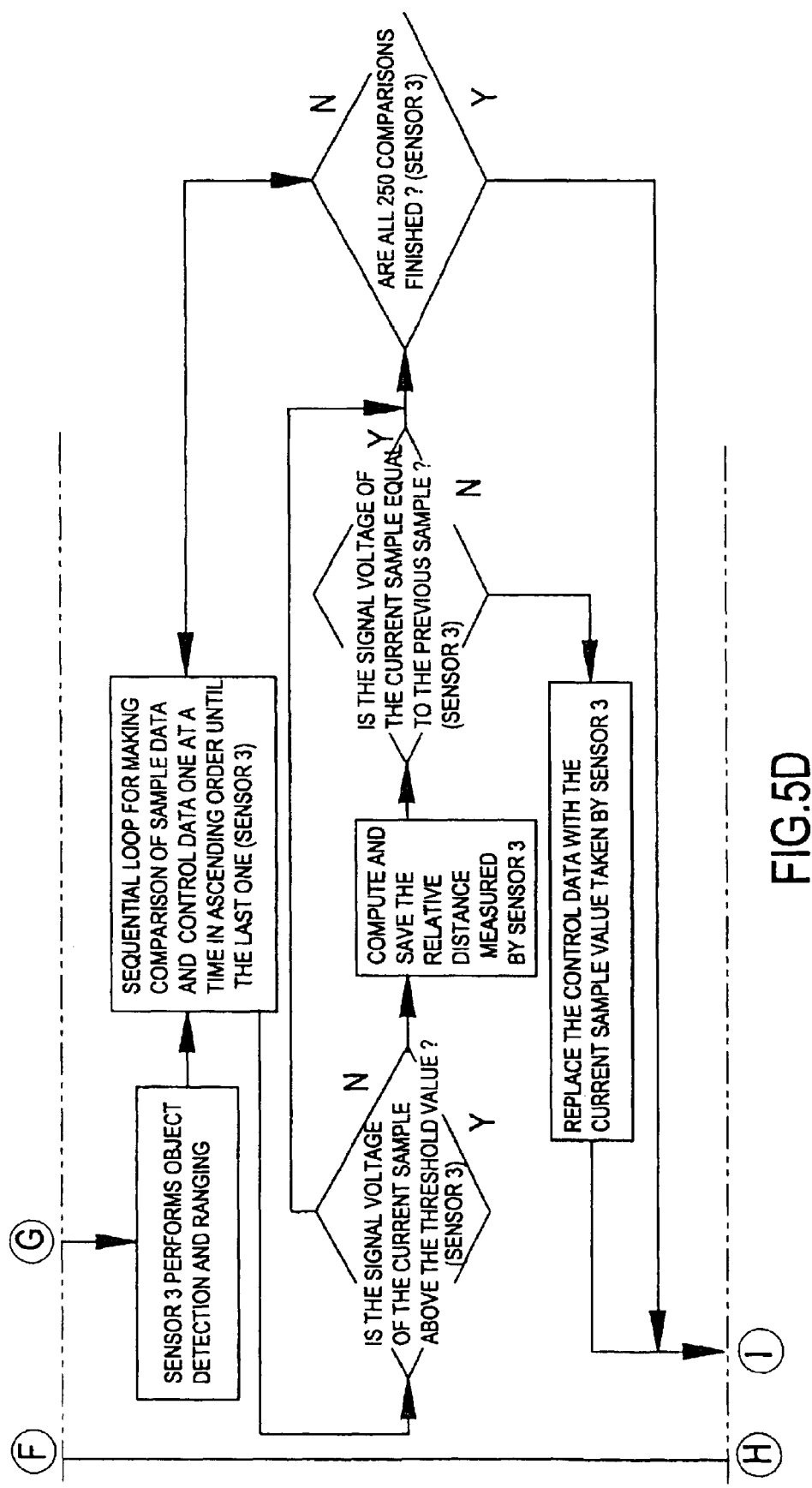
Figure 5F:
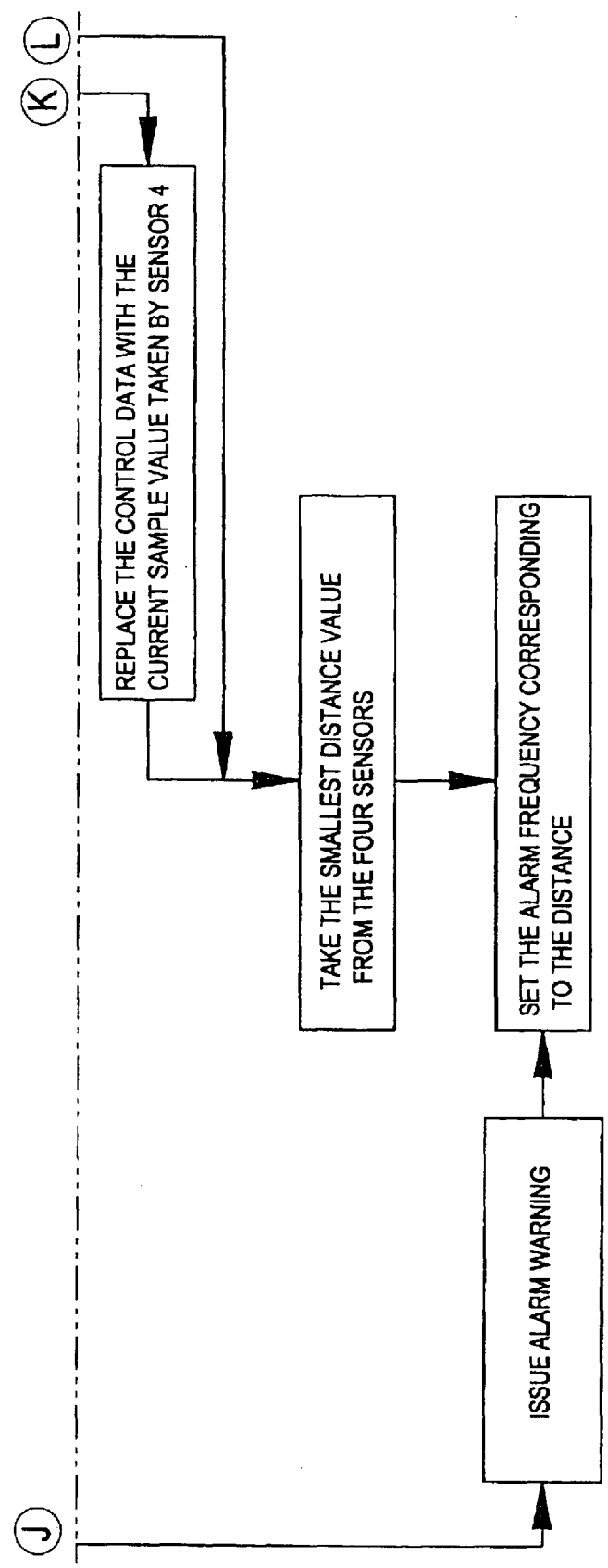

With reference to FIGS. 2A–2C, the processor (10) is an AT89C51 chip. Processor (10) P00–P07 pins are respectively connected to data pins (D0–D7) on the memory device (20) and also to low-address pins (A0–A7) on the memory device (20) through a latch (11). Processor (10) pins P20–P22 are respectively connected to high-address pins (A8–A10) on the memory device (20), and processor (10) pins P23–P27 are connected to the A/D converter (50).

When the processor (10) reads data saved in the memory device (20), it first puts the address signals on pins P00–P07 and P20–P22, which are directed to a memory address in the memory device (20). After finishing the memory addressing, the processor (10) then performs normal data read/write through data pins D0–D7.

The A/D converter (50) mainly comprises a voltage doubling circuit (51) and a comparator (52). The doubling circuit (51) is formed by multiple resistors (R1, R6–R15) connected to form a binary multiplier. The positive input of the comparator (52) is connected to the output of signal amplifier (60) (pin P3.5) for receiving ultrasonic signals input after amplification. The reference voltage terminal, the output of the voltage doubling circuit (51), is connected to the output of the 5-stage voltage doubling circuit (51).

Incoming signals received by the sensor array (70) through the channel selector (30) are amplified by the amplifier circuit (60). The amplified signal is passed through pin 3.5 to the positive input of comparator (52) for comparison with the reference voltage level output from the 5-stage voltage doubling circuit (51).

The generation of reference voltages is described below. Values in binary format, from 00000 to 11111, are output on pins P23–P27 of the processor (10) in accordance with a predetermined sequence, and then they are passed through various resistors of the 5-stage voltage doubling circuit (51) and are converted to corresponding reference voltages. A conversion table of the various reference voltages and the matching data pattern on pins P23–P27 follows.

| P27 | P26 | P25 | P24 | P23 | Reference voltage output |
|---|---|---|---|---|---|
| 0 | 0 | 0 | 0 | 0 | 0 V |
| 1 | 0 | 0 | 0 | 0 | Vcc/32 |
| 0 | 1 | 0 | 0 | 0 | 2*Vcc/32 |
| 1 | 1 | 0 | 0 | 0 | 3*Vcc/32 |
| 0 | 0 | 1 | 0 | 0 | 4*Vcc/32 |
| 1 | 0 | 1 | 0 | 0 | 5*Vcc/32 |
| 0 | 1 | 1 | 0 | 0 | 6*Vcc/32 |
| 1 | 1 | 1 | 0 | 0 | 7*Vcc/32 |
| 0 | 0 | 0 | 1 | 0 | 8*Vcc/32 |
| 1 | 0 | 0 | 1 | 0 | 9*Vcc/32 |
| 0 | 1 | 0 | 1 | 0 | 10*Vcc/32 |
| 1 | 1 | 0 | 1 | 0 | 11*Vcc/32 |
| 0 | 0 | 1 | 1 | 0 | 12*Vcc/32 |
| 1 | 0 | 1 | 1 | 0 | 13*Vcc/32 |
| 0 | 1 | 1 | 1 | 0 | 14*Vcc/32 |
| 1 | 1 | 1 | 1 | 0 | 15*Vcc/32 |
| 0 | 0 | 0 | 0 | 1 | 16*Vcc/32 |
| 1 | 0 | 0 | 0 | 1 | 17*Vcc/32 |
| 0 | 1 | 0 | 0 | 1 | 18*Vcc/32 |
| 1 | 1 | 0 | 0 | 1 | 19*Vcc/32 |
| 0 | 0 | 1 | 0 | 1 | 20*Vcc/32 |
| 1 | 0 | 1 | 0 | 1 | 21*Vcc/32 |
| 0 | 1 | 1 | 0 | 1 | 22*Vcc/32 |
| 1 | 1 | 1 | 0 | 1 | 23*Vcc/32 |
| 0 | 0 | 0 | 1 | 1 | 24*Vcc/32 |
| 1 | 0 | 0 | 1 | 1 | 25*Vcc/32 |
| 0 | 1 | 0 | 1 | 1 | 26*Vcc/32 |
| 1 | 1 | 0 | 1 | 1 | 27*Vcc/32 |
| 0 | 0 | 1 | 1 | 1 | 28*Vcc/32 |
| 1 | 0 | 1 | 1 | 1 | 29*Vcc/32 |
| 0 | 1 | 1 | 1 | 1 | 30*Vcc/32 |
| 1 | 1 | 1 | 1 | 1 | 31*Vcc/32 |

Data patterns representing different voltage levels are output sequentially from the processor (10) to the voltage doubling circuit (51) and are converted to different reference voltages. These reference voltages corresponding to the sampled signal to be compared are passed to the negative input of the comparator (52) to be compared with the sampled signal on the positive input. The process is repeated in like manner for all sampled signals in the predetermined sequence. Going down the sequence of sampled signals in the comparing process, if the voltage level of one sampled signal is found to be above the reference voltage, the analog signal is therefore converted to digital form to compute the digital value of the input signal.

With reference to FIGS. 3A–3D, the select pins (SEL0, SEL1) of the processor (10) are respectively connected to a first switch (31) and a second switch (32) of the channel selector (30). These two switches (31, 32) are used for selection of one signal transceiver from among four signal sensors or transceivers (71–74) in the sensor array (70) in array ordering. The processor (10) then outputs control signals through select pins (SEL0, SEL1) to order these two switches (31, 32) to select one of the four signal sensors or transceivers (71–74) for the generation of ranging signals from the power booster (40).

Conversely, select pins (SEL0, SEL1) of the processor (10) can be also used to receive echoed signals originating from one of the four signal sensors or transceivers (71–74). When the echoed signal is received by one of the signal sensors or transceivers (71–74), the signal is routed through the pair of switches (31, 32) to the signal amplifier (60). After three-stage signal amplification in the signal amplifier (60), the signal is passed through pin P3.5 to the comparator (52) in the A/D converter circuit (as shown in FIGS. 2A–2C). A shielding circuit (61), also part of the signal amplification circuit (60), is implemented by controlling the breakover timing of the transistor, which is carried out by the processor (10). When the path through the transistor is cut off, the gain on the first-stage op-amp begins to attenuate, thus suppressing stray signals.

According to the object detection and ranging method proposed by the present invention, all signal sensors or transceivers (71–74) are first initialized. Following a sequence established by the processor (10), each one of the signal sensors or transceivers (71–74) gets a chance to transmit a ranging signal, and later each takes successive samples of an echoed signal by the same sequence.

For the part of successive sampling of echoed signals, the processor (10) initiates signal sampling every few microseconds and continues until the end of the sequence for a predetermined number of times (for the present embodiment the interval between two successive samples is 118 microseconds and a complete sequence involves 250 successive samples). For the purpose of this illustration, the effective range of the sensors (71–74) is five meters. Given that 250 samples are to be taken for each echoed signal, a sample will be taken every time a signal travels through two centimeters of free space, thus a total of 250 instances of each echoed signal are collected in the signal reception. These sample data are saved in the memory device (20) in a digital format for subsequent computation of relative distance.

With reference to FIG. 4, after the first round of detection and ranging operation, all sensors (71–74) have had a chance to transmit a ranging signal and receive an echoed signal in accordance with the array ordering. The corresponding sample data are collected and saved in the memory device (20). The designations mXn, mYn, mZn, and mWn respectively represent the sampled signals collected by the sensors (71–74) in ascending order. The suffix "n" represents the sample order in the sequence, and the prefix "m" represents the round number of the detection and ranging operation. A set of threshold values (Vn) with number matching with sampled signals is also saved in the memory device (20). Since the magnitude of echoed signal varies with the physical distance from the reflection point, the threshold values V1–V250 are calculated on the basis of the various distance, where V1>V250.

With reference to FIGS. 5A–5F, when the vehicle backing system is enabled, the signal sensors or transceivers (71–74) are first initialized. The initialization process includes clearing out all previous data from the memory device (20); activating the sensors or transceivers (71–74) to transmit a test signal; and recording the duration for a signal to travel back and the time for stray signals to fade out. These temporal data are used to set up the cutoff point of echoed signals and the shielding time for stray signals. According to the characteristics of ultrasonic signal transmission, the bulk of energy in a detection and ranging signal is emitted in a specific direction. When the signal hits an object it returns in the same direction to the receiver. One can reasonably assume that the strongest signals are echoed back from an object in the same direction as it was emitted. Unlike echoed signals, stray signals through indirect reflection usually take longer to come back, and their magnitude are also weaker than the former one. The signal cutoff point can be used to discriminate echoed signals from stray signals. A shielding time, which is based on the existence of stray signals, can be used as a time parameter in the shielding circuit (61) implemented through a transistor. By controlling the breakover timing of the transistor, the processor is able to suppress a stray signal following an echoed signal.

After the initialization, the regular ranging operation can be started. A first round of samples of an echoed signal is latched in by all the sensors (71–74) in accordance with array ordering. These sample data are then converted and saved in the memory device (20) in accordance with the predetermined sequence. After being saved in memory, each sample data is compared either with respective threshold value and/or control data in a sequential order on the basis of magnitude of the signal. The first digitized sampled signal (1Xn) from the first transceiver (71) is compared with the corresponding threshold value Vn to determine whether 1Xn>Vn. If the voltage level of the sampled signal (1Xn) is above the corresponding threshold value (Vn), an object is present in the sensor detection range. The current sample data is passed to the processor (10) for distance computation. The distance is computed by taking the sample number n and multiplying by two to produce the necessary distance value in centimeters. Since the value of the previous sample is zero in the first round of sampling, the sample data (1Xn) is sequentially saved in the memory device (20) as control data for subsequent comparisons.

If the outcome of 250 sample comparisons all fail to find one sample value above the corresponding threshold value for all sensors (71–74) after the first round, then it can be determined that the sensors (71–74) have not encountered any obstruction. All sensors (71–74) continue with the detection and ranging operation in array ordering as long as the backing system is in active mode. If the operation results of these four sensors indicate the presence of an object in the detection range, that is their sampled values are above the threshold values, then the one generating the smallest distance value among all four sensors (71–74) is regarded as the actual distance from the object. Accordingly, the processor (10), after receiving the distance information, activates the alarm (80) with the frequency set to correspond to the relative distance.

With reference to FIG. 4, when performing the second round of detection and ranging operation (that is m=2) using the above four sensors (71–74), each one of the four sensors again takes the same number of samples (2Xn, 2Yn, 2Zn, 2Wn) of an echoed signal as is done in the first round. These sample data (mXn) are again converted to digital format and saved in the memory device (20) in a sequential order to be used for comparison with the control set ((m−1)Xn), which are the sample data from the first round of operation previously saved in memory now becoming the environmental control parameters in the second round of sample comparison.

With reference to FIGS. 5A–5F, the newly sampled data in the second round of sampling are first compared with the corresponding threshold value Vn to determine whether 2Xn>Vn. If the voltage level of the sampled signal (1Xn) is notably above the corresponding threshold value (Vn), an object is present in the sensor detection range. The current sample data (2Xn) is passed to the processor (10) for distance computation. The same sample data (2Xn) is then compared with the previously saved control data to determine whether these two values are equal. If the two values (that is mXn=(m−1) Xn) are the same or close to each other; that means there has been little change in the environmental conditions. The current sample data (2Xn) is only used for distance computation. Since the value of the current sample data 2Xn is notably above the respective threshold value, it means that an object is present, so the order "n" in the sequence is multiplied by two to derive the relative distance value in centimeters. But if the value of current sample data 2Xn is either greater of less than the control data 1Xn, that means the current sample value (2Xn) is different from the control data, therefore the respective control data is replaced by the current sample data by sequentially saving the current value in the memory device (20) for subsequent comparisons. The above ranging process is repeated for all four sensors in accordance with array ordering. If one or more object is present, one or more from the four sensors (71–74) will have detected and computed the relative distance, but only the one with the smallest distance value will be selected by the processor to represent the actual distance from the nearest object. The processor (10) then activates the alarm with the frequency set to correspond to the distance computed.

More rounds of detection and ranging may be performed depending on the status of the backing system, but the sampling sequence and the comparison procedures for the subsequent rounds of detection and ranging operation are basically similar to that of the second round. Through the process of dynamic adjustment of environmental control parameters described above, the vehicle backing system in accordance with the invention is able to enhance the accuracy of object detection and ranging.

The present invention is not limited to the specially disclosed embodiments and variations, and modifications may be made without departing from the scope and spirit of the invention.

What is claimed is:

1. An apparatus for object detection and ranging used by a vehicle backing system, which includes:

a processor, which is connected to an alarm and a memory device, and is used for detecting objects and issuing a warning when there is obstruction;

a channel selector, which is controlled by the processor and is used to select one sensor in a sensor array composed of a plurality of sensors;

multiple power boosters, which are connected between the channel selector and the plurality of sensors in the sensor array for controlling the signal transmission by the above sensors; and an A/D converter, which is connected between the channel selector and the processor, and is used to convert the received signal to a digital format for computation of relative distance;

whereby, the processor through the channel selector governs the sequence of transmission of a ranging signal by one of the sensors in accordance with a given sequence, and later the reception of echoed signals, by the same sequence, which are then converted by the A/D converter to a digital format for computation of relative distance.

2. An apparatus for object detection and ranging used by a vehicle backing system as claimed in claim 1, wherein the A/D converter is connected through a signal amplifier to the channel selector, and then further connected to the sensor array; whereby the signal received from the sensor array is amplified and passed to the comparator in the A/D converter circuit.

3. An apparatus for object detection and ranging used by a vehicle backing system as claimed in claim 1, wherein a latch is used to connect the I/O pins of the processor and the address pins of the memory device.

4. An apparatus for object detection and ranging used by a vehicle backing system as claimed in claim 1, wherein the A/D converter includes:

a voltage doubling circuit whose inputs are connected to the processor; and a comparator where one input is connected to the output of the signal amplifier, the other input is connected to the output of the voltage doubling circuit, and the output of the comparator is connected to the processor.

5. An apparatus for object detection and ranging used by a vehicle backing system as claimed in claim 4, wherein the signal amplifier is formed from multiple cascaded operational amplifiers.

6. An apparatus for object detection and ranging used by a vehicle backing system as claimed in claim 5, wherein the output from the first-stage operational amplifier in the signal amplification circuit is connected in series with a noise shielding circuit.

7. An apparatus for object detection and ranging used by a vehicle backing system as claimed in claim 1, wherein the alarm is implemented by a buzzer.

* * * * *